(No Model.) 3 Sheets—Sheet 1.
E. F. AUTENRIETH.
SANDPAPERING MACHINE.
No. 457,068. Patented Aug. 4, 1891.
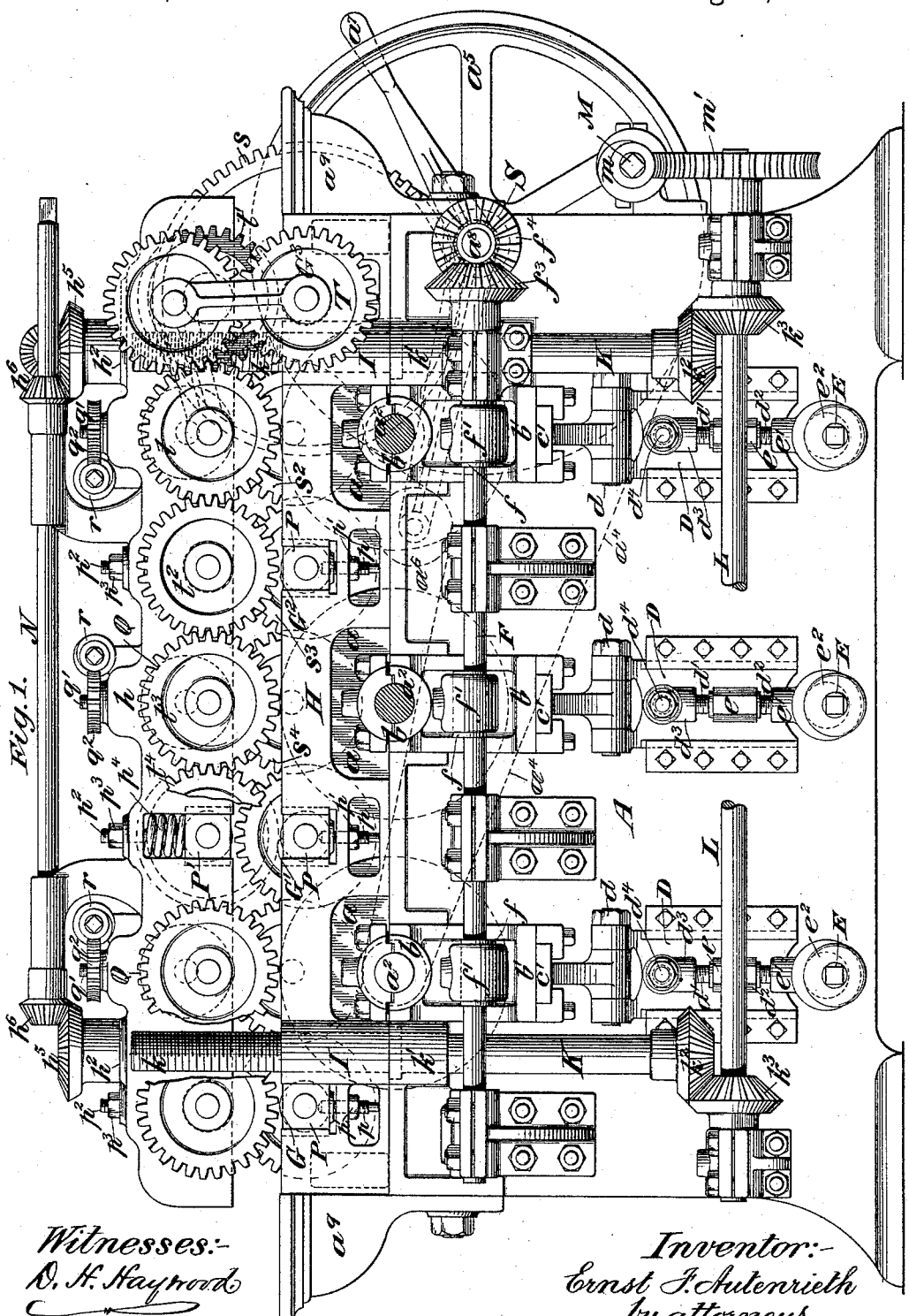
Witnesses:—
D. H. Hayward
Fred. Haynes
Inventor:—
Ernst F. Autenrieth
by attorneys
Brown & Seward (No Model.) 3 Sheets—Sheet 2.
E. F. AUTENRIETH.
SANDPAPERING MACHINE.
No. 457,068. Patented Aug. 4, 1891.
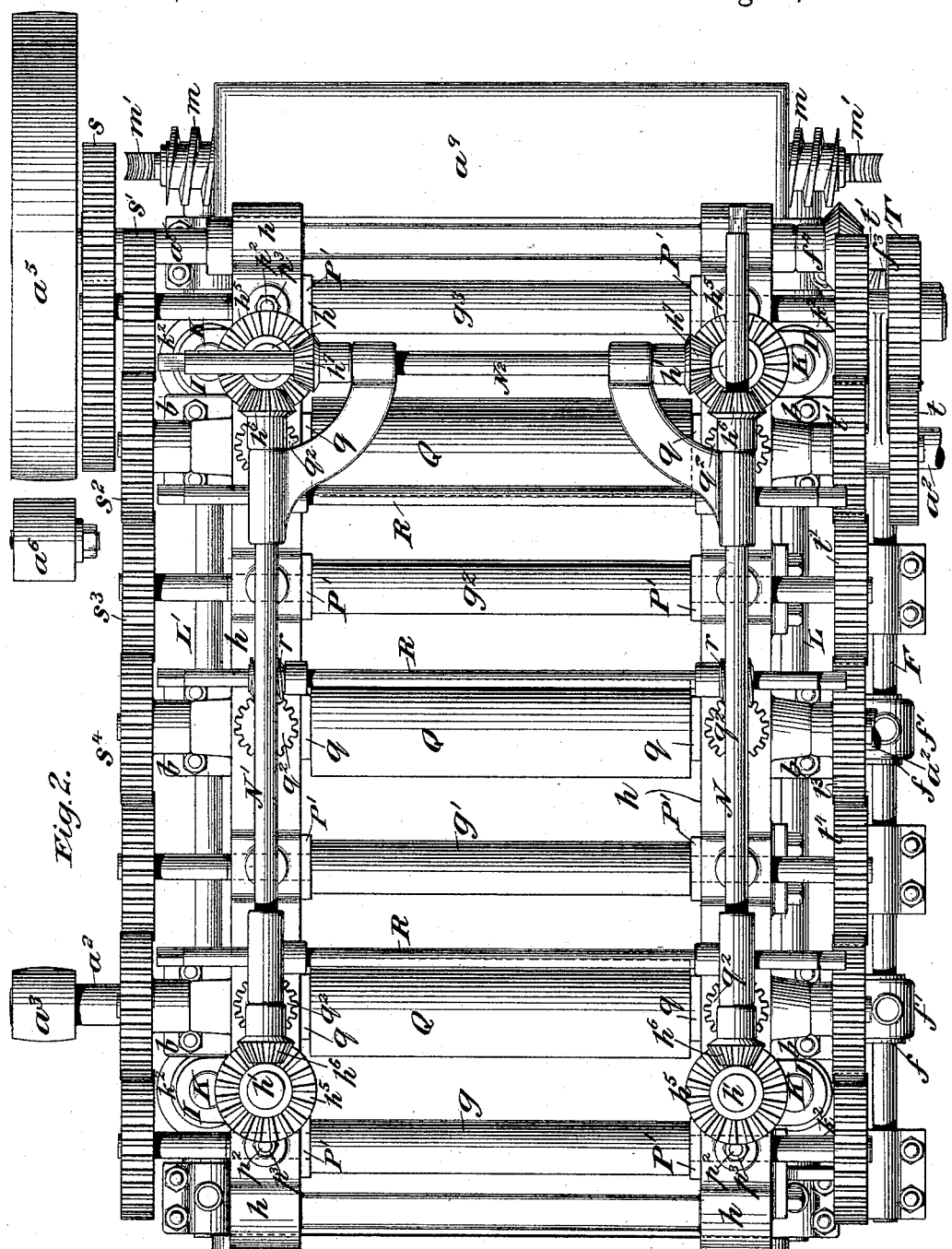
Witnesses:
D. H. Haywood
Fred Haynes
Inventor:
Ernst F. Autenrieth
by attorneys
Brown & Seward (No Model.) 3 Sheets—Sheet 3.
E. F. AUTENRIETH.
SANDPAPERING MACHINE.
No. 457,068. Patented Aug. 4, 1891.
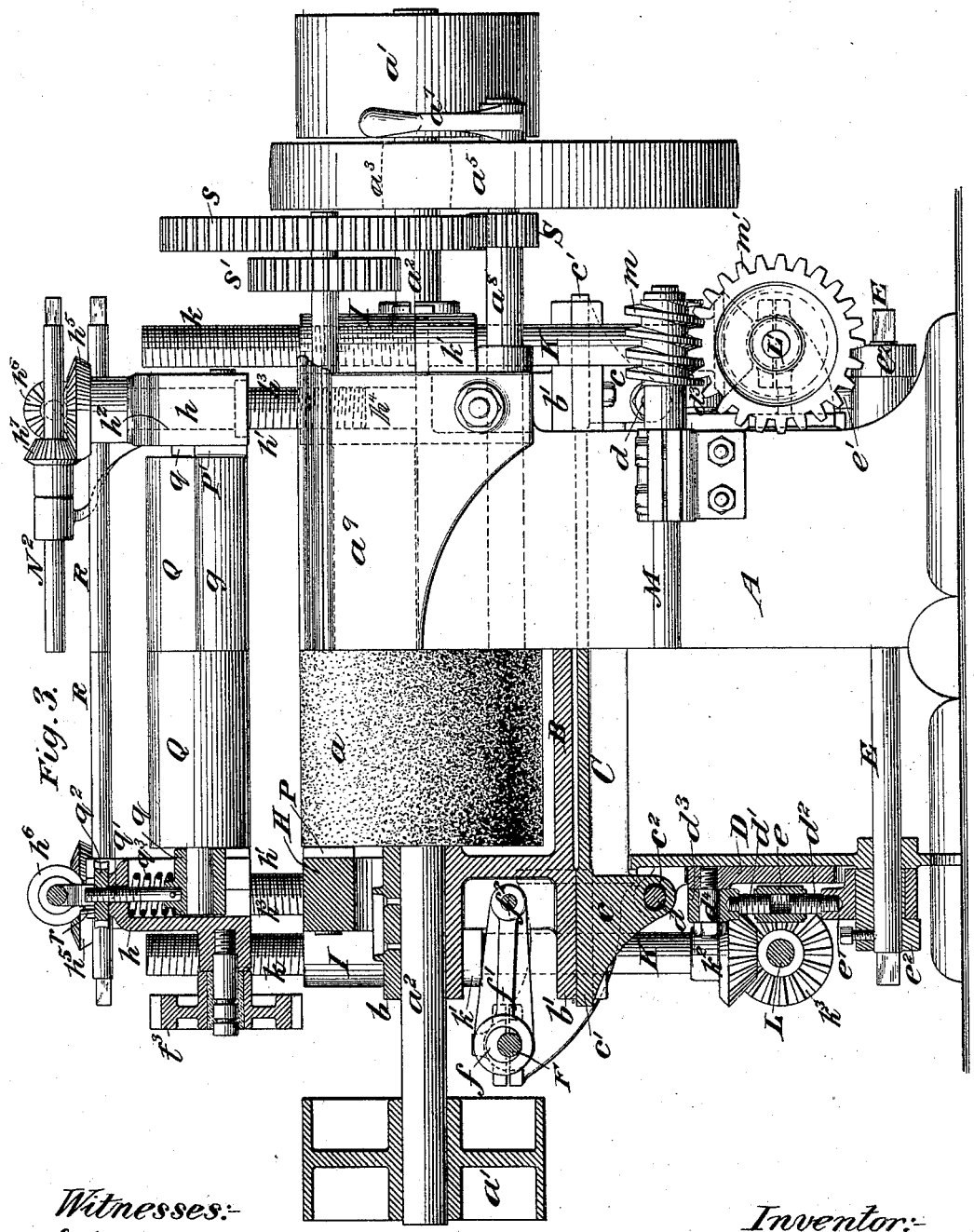
Witnesses:
D. H. Haywood
Fred Haynes
Inventor:
Ernst F. Autenrieth
by attorneys
Brown & Seward

United States Patent Office.

ERNST F. AUTENRIETH, OF NEW YORK, N. Y.

SANDPAPERING-MACHINE.

SPECIFICATION forming part of Letters Patent No. 457,068, dated August 4, 1891.

Application filed March 16, 1891. Serial No. 385,248. (No model.)

*To all whom it may concern:*

Be it known that I, ERNST F. AUTENRIETH, of the city and county of New York, in the State of New York, have invented a new and useful Improvement in Sandpapering-Machines, of which the following is a specification.

My invention relates to an improvement in sandpapering-machines in which provision is made for gaining access to the sand-paper drums by the simultaneous movement of the upper and lower feed-rollers away from the drums, while the bed-plate remains fixed and for effecting the several adjustments of the movable parts in an effective and desirable manner.

A practical embodiment of my invention is represented in the accompanying drawings, in which—

Figure 1 is a view of the machine in side elevation. Fig. 2 is a top plan view; and Fig. 3 is an end view, partly in section.

The bed of the machine is represented by A, and in its upper portion the several sand-drums $a$—in the present instance three—are journaled. The several sand-drums are independently driven by means of suitable pulleys $a'$, fixed to their shafts $a^2$, two of the three pulleys $a'$ being located upon one side of the machine and one upon the other.

Upon the shaft of one of the sand-drums there is fixed a small band-pulley $a^3$, from which a belt $a^4$ (represented in dotted lines in Fig. 1) extends to and around a pulley $a^5$ for actuating the several feed-rollers, hereinafter to be more particularly referred to, and for imparting to the several sandpapering-drums their endwise reciprocating movement. A belt-tightener consisting of a roller $a^6$, mounted in the end of a rocking-lever provided with the operating-handle $a^7$, serves to tighten the belt $a^4$ upon the wheel-pulley $a^5$, and thereby causes it to rotate or slacken it therefrom and allow it to rest or move slowly, according to the will of the operator.

The bearings for the sandpapering-drums $a$ and the means for adjusting them are constructed and arranged as follows: The bearings $b$ for the opposite ends of the roller are connected by a yoke-piece B, which extends from the bearing proper along the end to the periphery and along the periphery spaced therefrom to the opposite end of the roller, and thence partially across the end to the opposite bearing $b$. The lower halves of the bearings $b$ and the yoke-piece B are preferably formed integral, and the portion of the yoke-piece which extends along the periphery of the drum is extended at its opposite ends, forming bearings $b'$, which rest and slide upon bearings $c'$ at the ends $c$ of a supporting yoke-piece C. The ends of the supporting-yoke piece C are pivotally secured to studs $d$ at the upper ends of vertically-sliding standards D. The standards D are supported upon a rock-shaft E by means of right and left screws $d'$ $d^2$, connected by a common nut $e$, having screw-threads in its opposite ends, adapted to register with the screw-threads on the right and left hand screws, one of the screws being engaged with a bearing-piece $d^3$, fixed to the vertically-sliding standard D—in the present instance by means of a screw-bolt $d^4$—and the other screw being engaged at its lower end with a bearing-piece $e'$, loosely mounted upon a cam $e^2$, fixed upon the rock-shaft E. By the above arrangement it will be observed that the turning of the nut $e$ at one end of the drum will elevate or depress that end of the drum without disturbing the other end for the reason that it will elevate or depress the standard D, and thereby the end $c$ of the supporting-yoke C, and hence the end $b'$ of the yoke B, the bearing-pieces $e'$ seated upon the cams $e^2$ remaining in their positions. When, however, it is desired to elevate both ends of the sandpapering-drums simultaneously, it may be accomplished by rotating the rock-shaft E and hence the cams $e^2$, fixed thereon. To accommodate the end of the supporting-yoke C to the slight variation from the vertical as it is elevated or depressed independently of the other end, I have slightly elongated the opening in the end $c$, which receives the stud $d$, as shown at $c^2$, Fig. 3.

The endwise-reciprocating movement is imparted to the drums by means of a rotary shaft F, provided with cams $f$, one for each drum, the said cams being embraced by the ends of connecting-links $f'$, the opposite ends of the links being pivotally connected, as at $f^2$, to the ends of the yoke B. The cams $f$ are so set upon the shaft F that one of the drums will be moving endwise in one direction while the drum adjacent thereto is moving in the opposite direction. The shaft F is rotated by means of a bevel-gear wheel $f^3$, fixed to its end in position to mesh with a bevel-gear wheel $f^4$, fixed to the shaft $a^8$ of the belt wheel or pulley $a^5$.

The bed A of the machine is provided at its ends with bed-plates $a^9$, fixed thereto, the faces of which are intended to rest substantially in line with the tops of the drums $a$.

The lower feed-rolls are represented by G G', &c., and the upper feed-rolls are represented by $g$ $g'$, &c. The lower feed-rolls are journaled in a frame H, vertically movable with respect to the bed A and bed-plates $a^9$, and the upper feed-rolls are journaled in a frame $h$, vertically movable with respect to the frame H, and, because of its dependence upon the frame H as its support, is vertically movable together with the frame H, as well as independently thereof.

The frame H is provided at or near its four corners with screw-threaded sockets I, which are adapted to receive and register with the screw-threaded portions $k$ of the rotary posts K, swiveled in suitable bearings $k'$ of the machine-bed A. The posts K are provided at their lower ends with bevel-gear $k^2$, which intermeshes with bevel-gear $k^3$, fixed on the operating-shafts L and L', one on each side of the machine.

The shafts L and L' are operated simultaneously by means of a worm-shaft M, provided at or near its opposite ends with worms $m$, which engage worm-wheels $m'$, fixed on the shafts L and L'. The worm-shaft M may be provided with any well-known or suitable means for rotating it at pleasure, and thereby simultaneously rotating the posts K, and so elevating the frame H and all the parts supported by said frame H upwardly away from the bed A and from the sandpapering-drums journaled therein. The intention is to give the frame H and the parts carried thereby an extent of vertical movement sufficient to leave a space above the sandpapering-drums for convenient access to them for any purpose and also sufficient to admit of the removal of the drums from their bearings by lifting them above the top of the bed A and then sliding them endwise.

The frame $h$, which carries the upper feed-rolls $g$ $g'$, &c., is supported upon the frame H by means of rotary posts $h'$, preferably located at or near its corners, and swiveled in suitable sockets $h^2$ in the frame $h$. The lower ends of the posts $h'$ are screw-threaded, as shown at $h^3$, and extend downwardly into screw-threaded sockets $h^4$, formed in the frame H. The upper ends of the said posts $h'$ are provided with bevel-gear $h^5$, which intermeshes with bevel-gear $h^6$, fixed on rotary shafts N and N', one located on each side of the machine, one of said shafts—in the present instance the shaft N—having its end squared for applying a crank thereto for rotating it. One set of bevel-gears $h^5$ at one of the ends of the machine is further connected by means of a transverse rotary shaft $N^2$, which has fixed thereon bevel-gear $h^7$, which intermeshes with the gear $h^5$, and said shaft $N^2$ is also conveniently provided with a squared end for the attachment of an operating-crank thereto.

By the above construction and arrangement of parts it will be observed that when either the shaft N or the shaft $N^2$ is rotated it will simultaneously rotate the four posts $h'$, and will thereby screw the frame $h$ up or down relative to the frame H by the engagement of the threaded portions of the posts in the sockets $h^4$.

In addition to the simultaneous adjustment of the upper feed-rolls toward and away from the lower feed-rolls, the said rolls in both the upper and lower frames have independent adjustments at each end. The lower bearings P have a vertically-sliding movement in the frame H, and adjusting-screws $p$ are provided with suitable nuts $p'$ to fix the bearings in the desired elevation. The upper bearings P' have a vertically-sliding movement in the frame $h$, and are suspended by means of screw-threaded stems $p^2$, provided with nuts $p^3$, the bearings being normally depressed by means of springs $p^4$, engaged therewith.

The feed-rolls, upper and lower, are located intermediate of the sandpapering-drums, while directly above the sandpapering-drums pressure-rollers Q are journaled in the upper frame H. The bearings $q$ of the pressure-rollers are allowed a vertically-sliding movement in the frame $h$, and are held suspended by screw-threaded stems $q'$, upon which worm-wheel nuts $q^2$ are adapted to screw, and thereby elevate the stems $q'$, and hence the bearings $q$, or allow the said bearings to slide downwardly under the normal pressure of interposed springs $q^3$.

Each pair of worm-wheel nuts $q^2$, corresponding to the bearings of one of the pressure-rollers Q, is operated by a rotary shaft R, provided with worms $r$ thereon, adapted to engage with the worm-wheel nuts $q^2$. The opposite ends of the operating-shaft R are conveniently extended and squared to receive an operating-crank. By this arrangement any one of the pressure-rollers Q may be allowed to exert more or less pressure upon the material passing beneath it over the sandpapering-drum, as may be desired.

The lower and upper feed-rolls are positively driven by a system of gear arranged as follows: A pinion S, fixed on the shaft $a^8$ of the belt wheel or pulley $a^5$, gears with a spur-wheel $s$, fixed on the shaft of one of the lower end feed-rolls G, which shaft also has fixed thereon a spur-wheel $s'$, which intermeshes with a dummy spur-wheel $s^2$, and this with a corresponding spur-wheel $s^3$, fixed on the shaft of the next succeeding feed-roller, and this with a dummy spur-wheel $s^4$, and so on throughout the series of lower feed-rolls. The opposite end of the shaft on which the spur-wheel $s'$ is fixed carries a spur-wheel T, connected by ordinary expansion-gear, with a dummy spur-wheel $t$, mounted upon the upper frame H, the latter intermeshing with spur-wheels $t'$ and $t^2$, fixed to the shafts of the upper feed-rolls upon opposite sides of the dummy $t$. The spur-wheel $t^2$ intermeshes with a dummy $t^3$, and this in turn with a spur-wheel $t^4$, fixed on the shaft of the next succeeding upper roll, and so on. By the above construction and arrangement of parts I am enabled to elevate the upper and lower sets of feed-rolls without disturbing the bed-plates, so as to gain access to the sandpapering-drums, or, if necessary, to remove them bodily from the machine. I am further enabled to adjust either end of the sandpapering-drums without any liability of the disarrangement of the drum-shaft in the opposite bearings, while the yoking of the two bearings together, in addition to keeping them at all times in alignment, furnishes a convenient means for reciprocating them endwise. It will also be observed that provision is made for simultaneously adjusting the entire upper set of feed-rolls toward and away from the lower set, and at the same time for adjusting either end of any one of the upper or lower feed-rolls or of the sandpapering-drums independently.

What I claim as my invention is—

1. The combination, with the bed of the machine and the bed-plates fixed thereto, of vertically-adjustable sandpapering-drums journaled in the bed intermediate of the bed-plates, and a series of upper and lower feed-rolls having a vertical adjustment in unison away from and toward the sandpapering-drums independent of the bed-plates, substantially as set forth.

2. The combination, with the bed of the machine and the bed-plates fixed thereto, of vertically-adjustable sandpapering-drums journaled in the bed intermediate of the bed-plates, a frame carrying the lower set of feed-rolls and having a vertical adjustment upon its supports independently of the bed-plates, and a frame carrying the upper set of feed-rolls, supported upon the frame carrying the lower set of feed-rolls and having a vertical adjustment relative to the frame carrying the lower set of feed-rolls, substantially as set forth.

3. The combination, with the machine-bed and the bed-plates fixed thereto, sandpapering-drums journaled in the bed, a frame carrying the lower feed-rolls and supported upon rotary posts, the said frame, and the bed of the machine, the one having a screw-threaded engagement with the rotary posts and the other a swiveled engagement therewith, a frame carrying the upper set of feed-rolls and supported upon the frame carrying the lower set of feed-rolls, and means for simultaneously rotating the several posts which support the frame carrying the lower feed-rolls, substantially as set forth.

4. The combination, with the machine-bed, the sandpapering-drums journaled therein, the frame carrying the lower feed-rolls having a vertical adjustment relatively to the bed and the frame carrying the upper feed-rolls supported upon and having a vertical adjustment relative to the frame carrying the lower feed-rolls, of pressure-rolls journaled in the frame carrying the upper feed-rolls, means for adjusting the feed-roll frames in unison toward and away from the bed, means for adjusting the upper feed-rolls and pressure-rolls simultaneously toward and away from the lower feed-rolls, and means for adjusting either end of each feed-roll toward and away from the opposite feed-roll independently of the other end, substantially as set forth.

5. The combination, with the machine-bed and a sandpapering-drum, of bearings for the opposite ends of the drum, said bearings being yoked rigidly together, and means for simultaneously elevating and depressing the bearings, substantially as set forth.

6. The combination, with the bed of the machine and the sandpapering-drum, of bearings for the opposite ends of the drum, the said bearings being yoked rigidly together, a support for said yoke, vertically sliding standards upon which the opposite ends of said yoke-support rest, and means for moving the standards either simultaneously or independently, substantially as set forth.

7. The combination, with the bed and the sandpapering-drums, of bearings for the opposite ends of each of the drums, the bearings for each drum being yoked rigidly together, vertically-adjustable supports for said yokes, and means for reciprocating the said bearings, and hence the drums, endwise, substantially as set forth.

8. The combination, with the bed and the sandpapering-drum, of bearings for the opposite ends of the drum, said bearings being yoked together, a support for said yoke upon which it has an endwise sliding movement, vertically-movable standards upon which the said yoke-support rests at its opposite ends, cams for simultaneously elevating the standards, and hence the opposite ends of the drum, right and left screws intermediate of the cams and the standards for adjusting the ends of the drum independently of each other, and means for reciprocating the drum, substantially as set forth.

ERNST F. AUTENRIETH.

Witnesses:
FREDK. HAYNES,
GEORGE BARRY.